US010946746B2

(12) United States Patent
Hudson et al.

(10) Patent No.: US 10,946,746 B2
(45) Date of Patent: Mar. 16, 2021

(54) VEHICLE POWER SYSTEM INCLUDING ULTRA-CAPACITOR FOR MITIGATING TRANSIENT CURRENT EVENTS

(71) Applicant: Ford Global Technologies, LLC, Dearborn, MI (US)

(72) Inventors: Andrew Hudson, Sterling Heights, MI (US); David Celinske, Wolverine Lake, MI (US); John Anthony DeMarco, Lake Orion, MI (US); Farouq Mozip, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 16/259,296

(22) Filed: Jan. 28, 2019

(65) Prior Publication Data

US 2020/0238830 A1    Jul. 30, 2020

(51) Int. Cl.
| | |
|---|---|
| *B60L 3/00* | (2019.01) |
| *H02J 7/00* | (2006.01) |
| *B60L 50/40* | (2019.01) |
| *B60L 58/10* | (2019.01) |
| *H01G 9/26* | (2006.01) |
| *H02J 7/34* | (2006.01) |

(52) U.S. Cl.
CPC .............. *B60L 3/0046* (2013.01); *B60L 50/40* (2019.02); *B60L 58/10* (2019.02); *H01G 9/26* (2013.01); *H02J 7/0016* (2013.01); *H02J 7/0026* (2013.01); *H02J 7/345* (2013.01); *B60L 2260/40* (2013.01)

(58) Field of Classification Search
CPC .................................................. B60L 3/0046

USPC ........................................................ 320/166
See application file for complete search history.

(56) References Cited

U.S. PATENT DOCUMENTS

| | | | | |
|---|---|---|---|---|
| 7,023,107 | B2* | 4/2006 | Okuda .................. | H02J 7/1438 307/10.1 |
| 8,179,103 | B2 | 5/2012 | Doljack | |
| 8,210,145 | B2* | 7/2012 | Handa ..................... | H02J 7/345 123/179.3 |
| 8,723,474 | B2* | 5/2014 | Chiang ................... | B60L 50/40 320/103 |
| 9,573,486 | B2 | 2/2017 | Hoevenaars et al. | |
| 2008/0246443 | A1* | 10/2008 | Doljack .............. | F02N 11/0866 320/167 |
| 2010/0308650 | A1* | 12/2010 | Perseval ................. | H02J 7/345 307/10.1 |

(Continued)

FOREIGN PATENT DOCUMENTS

| | | |
|---|---|---|
| CN | 102139695 B | 7/2015 |
| FR | 2848736 B1 | 3/2005 |

OTHER PUBLICATIONS

Sebastien Wasterlain et al., *Hybrid Power Source With Batteries and Supercapacitor for Vehicle Applications*, Oct. 2006, 6 pages.

*Primary Examiner* — Jerry D Robbins
(74) *Attorney, Agent, or Firm* — Frank Lollo; Eversheds Sutherland (US) LLP

(57) ABSTRACT

A vehicle power system includes loads, a battery coupled to the loads, an ultra-capacitor coupled to the battery, and a bypass circuit. The loads, the ultra-capacitor, and the battery are electrically coupled in series. The bypass circuit monitors the ultra-capacitor and prevents the ultra-capacitor from over-discharging and reversing in polarity.

17 Claims, 5 Drawing Sheets

(56) References Cited

U.S. PATENT DOCUMENTS

2014/0084817 A1     3/2014    Bhavaraju et al.
2017/0057363 A1     3/2017    Huh et al.

* cited by examiner

VEHICLE POWER SYSTEM INCLUDING ULTRA-CAPACITOR FOR MITIGATING TRANSIENT CURRENT EVENTS

TECHNICAL FIELD

The present disclosure generally relates to a vehicle power system including an ultra-capacitor and, more specifically, a vehicle power system including an ultra-capacitor for mitigating transient current events in starting lighting and accessory (SLA) batteries.

BACKGROUND

Vehicles include SLA batteries for providing power to various vehicle loads. As loads increase in modern vehicles, large continuous and transient currents are imposed on the SLA batteries. Due to the internal resistance characteristics of the SLA batteries, supporting these large system currents are becoming increasingly difficult.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example power circuits and vehicle are described herein. A first example power circuit includes loads, an ultra-capacitor coupled to the loads, a battery coupled to the ultra-capacitor, and a bypass circuit. The loads, the ultra-capacitor, and the battery are electrically coupled in series. The bypass circuit monitors the ultra-capacitor and prevents the ultra-capacitor from over-discharging and reversing in polarity.

A second example power circuit includes loads, a battery coupled to the loads, an ultra-capacitor coupled to the battery and a bypass circuit. The loads, the ultra-capacitor, and the battery are electrically coupled in series. The bypass circuit monitors the ultra-capacitor and prevents the ultra-capacitor from over-discharging and reversing in polarity.

An example vehicle includes loads, an ultra-capacitor, a battery, and a bypass circuit. The loads, the ultra-capacitor, and the battery are electrically coupled in series. The bypass circuit monitors the ultra-capacitor and prevents the ultra-capacitor from over-discharging and reversing in polarity.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
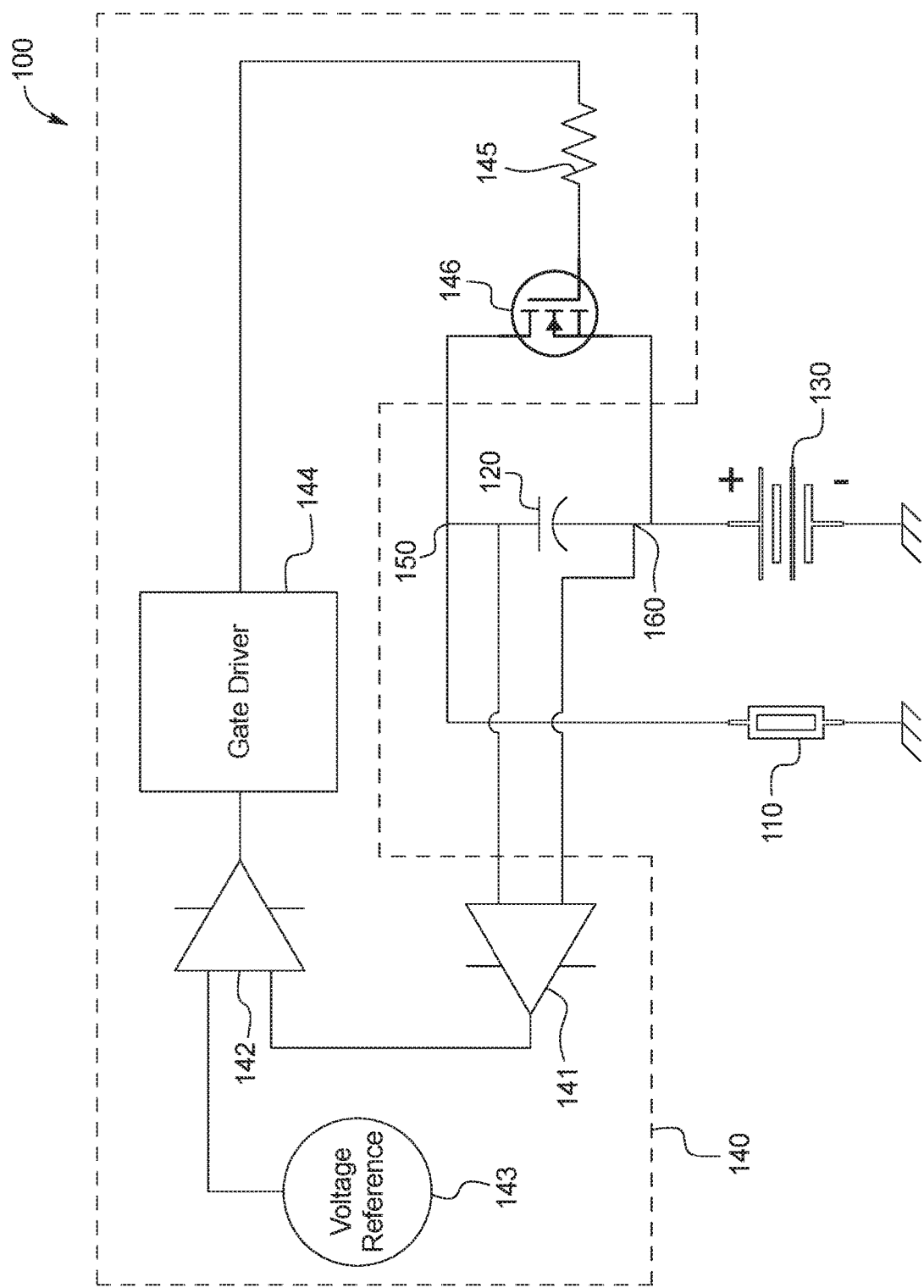
FIG. 1 illustrates a first example embodiment of a vehicle power system in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include SLA batteries for providing power to various vehicle loads such as starter motor, vehicle lighting devices, ignition system, vehicle accessories, etc. As modern vehicle technology continues to advance, performance demand on SLA batteries increases. Particularly, in cases where charging system faults occur in an autonomous vehicles, the burden for powering all of the critical vehicle systems and ensuring safe travel of said vehicles rests on the SLA batteries. These critical systems impose large continuous and transient currents on the SLA batteries. Due to the internal resistance characteristics of the SLA batteries, supporting these large system currents are becoming increasingly difficult. Therefore, there is a need for a remedy to such issue.

As disclosed herein, a vehicle power system includes an SLA battery, an ultra-capacitor, and a bypass circuit. The battery and the ultra-capacitor are electrically coupled in series. The bypass circuit is electrically coupled to the ultra-capacitor. In this configuration, the ultra-capacitor's low internal resistance and high power discharge capability takes the burden of supporting transient current events off of the SLA battery, thus, allowing the SLA battery to source the constant current loads. This configuration also allows the power system to maintain a higher floating voltage, when fully charged, as compared to a lower floating voltage if just an SLA battery is used. This helps to ensure that minimum voltage requirements for functional safety loads, such as steering and braking, are maintained during transient current events. The bypass circuit monitors and prevents the capacitor from over discharging and reversing in polarity. The bypass circuit includes: (1) pair of op-amps and a precision voltage reference to monitor the voltage level of the ultra-capacitor; and (2) a transistor to, in response to the voltage level of the ultra-capacitor nearing zero volts or falling below a reference voltage, activate and bypass the ultra-capacitor allowing for safe operation until charging is possible again.

In a first example embodiment of the vehicle power system, loads are electrically coupled to the anode of the ultra-capacitor, and the cathode of the ultra-capacitor is electrically coupled to the positive terminal of the SLA battery. The negative terminal of the SLA battery is grounded. The bypass circuit is electrically coupled to both the cathode and the anode. The bypass circuit includes a first op-amp, a second op-amp, a voltage reference, a gate driver, a resistor, and a transistor. The input terminals of the first op-amp are electrically coupled to the cathode and the anode, and the output of the first op-amp is electrically coupled to one of the input terminals of the second op amp. The voltage reference is further electrically coupled to the other input terminal of the second op-amp. The output terminal of the second op-amp is electrically coupled to the gate terminal. The gate driver and the resistor are electrically coupled in series. The resistor is electrically coupled to the gate of the transistor. The drain and the source of the transistor are electrically coupled to the anode and the cathode, respectively.

In a second example embodiment of the vehicle power system, the loads are electrically coupled to the positive terminal of the SLA battery, and the anode is electrically coupled to the negative terminal of the SLA battery. The cathode is grounded. The bypass circuit is electrically coupled to both the cathode and the anode. The bypass circuit includes a first op-amp, a second op-amp, a voltage reference, a resistor, and a transistor. The input terminals of the first op-amp are electrically coupled to the cathode and the anode, and the output of the first op-amp is electrically coupled to one of the input terminals of the second op amp. The voltage reference is further electrically coupled to the other input terminal of the second op-amp. The output terminal of the second op-amp is electrically coupled to the resistor. The resistor is electrically coupled to the gate of the transistor. The drain and the source of the transistor are electrically coupled to the anode and the cathode, respectively.

FIG. 1 illustrates the first example embodiment of the vehicle power system 100 in accordance with this disclosure. The vehicle power system 100 includes loads 110, an ultra-capacitor 120, an SLA battery 130, a bypass circuit 140, a first node 150, and a second node 160. The capacitance of the ultra-capacitor 120 may be 3400 F. The SLA battery 130 may be a 12 volt battery. The SLA battery 130 may be a lead-acid battery or a lithium battery. The bypass circuit 140 includes a first op-amp 141, a voltage reference 143, a second op-amp 142, a gate driver 144, a resistor 145, and a transistor 146. The first op-amp 141 is a differential amplifier including two input terminals and an output terminal. The first op-amp 141 amplifies the voltage difference between the two input terminals and suppresses any voltage common to said terminals. The second op-amp 142 is includes two terminals and an output terminal. The voltage reference 143 is electrically coupled to one of the two terminals of the second op-amp 142. The voltage reference 143 may supply a voltage of 0.1 to 0.2 volt. The second op-amp 142 alters its output voltage when the voltage of the ultra-capacitor 120 falls below the voltage level of the voltage reference 143. For example, the output voltage may be altered from 0 volt to 5 volts. The gate driver 144 may be complementary metal-oxide-semiconductor (CMOS). The transistor 146 may be a metal-oxide-semiconductor field-effect transistor (MOSFET).

In the illustrated example, the loads 110, the ultra-capacitor 120, and the SLA battery 130 are electrically coupled in series, sequentially. The first node is shared by the loads 110, one of the input terminals of the first op-amp 141, the anode of the ultra-capacitor 120, and the drain of the transistor 146. The second node is shared by the cathode of the ultra-capacitor 120, the other input terminal of the first op-amp 141, the source of the transistor 146, and the positive terminal of the SLA battery 130. The negative terminal of the SLA battery 130 is grounded. The output terminal of the first op-amp 141 is input to the second op-amp 142. The other input terminal of the second op-amp 142 is electrically coupled to the voltage reference 143. The output terminal of the second op-amp 142 is electrically coupled to the input of the gate driver 144. The output of the gate driver 144 is electrically coupled to the gate of the transistor 146 via the resistor 145.

Since the loads 110, the ultra-capacitor 120, and the SLA battery 130 are permanently connected in series, the ultra-capacitor 120's low internal resistance and high power discharge capability takes the burden of supporting transient current events off of the SLA battery 130, thus, allowing the SLA battery 130 to source the constant current loads 110. Further, this configuration also allows the power system 100 to maintain a higher floating voltage (e.g., 15 V) when fully charged as compared to a lower floating voltage (e.g., 12.8 V) if just an SLA battery 130 is used, thus, ensuring that minimum voltage requirements for functional safety loads 110 such as steering and braking are maintained during transient current events.

Figure 2A:
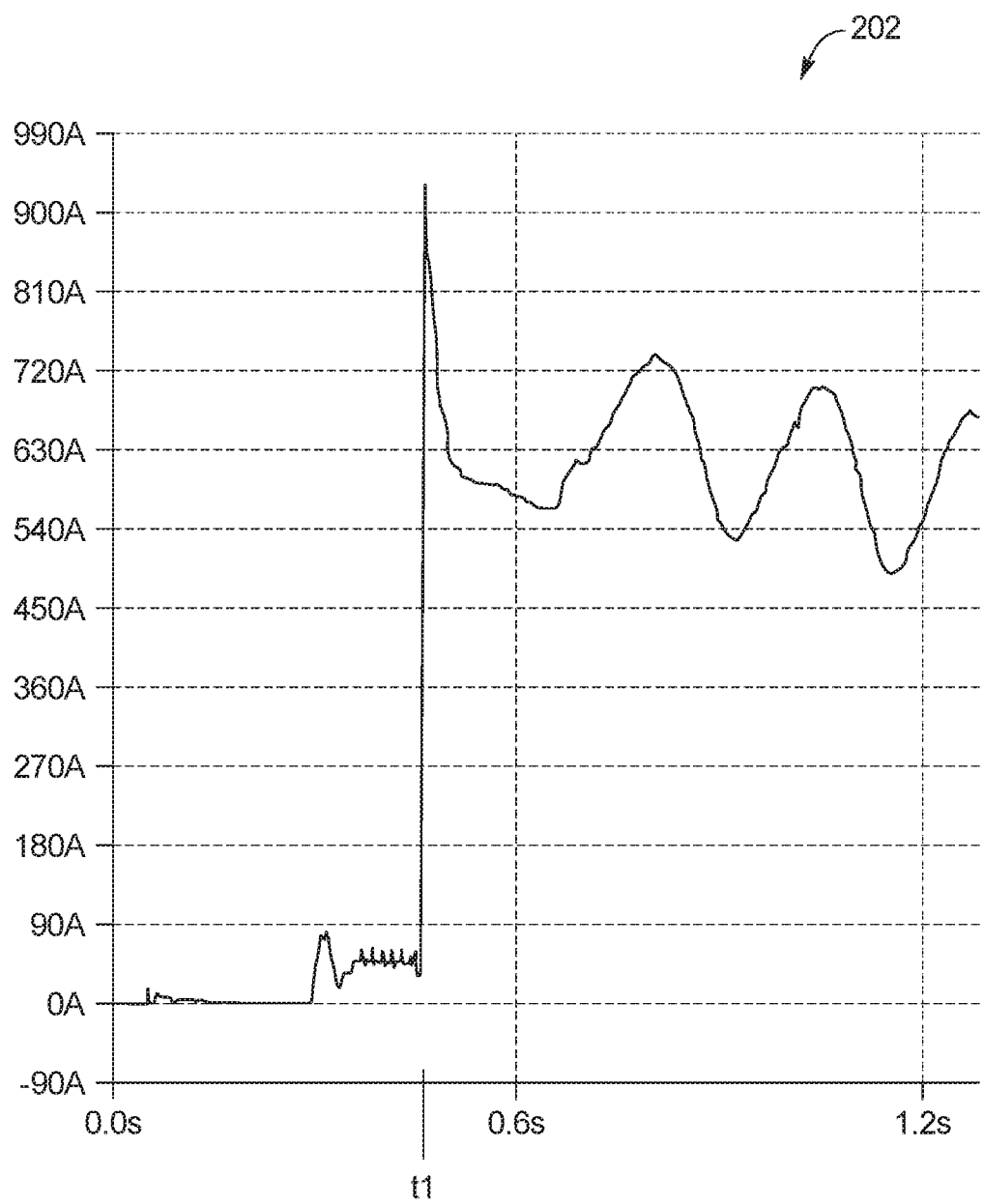
FIGS. 2A-2C illustrate example waveforms of a conventional power system and the vehicle power system in accordance with this disclosure.
Figure 2B:
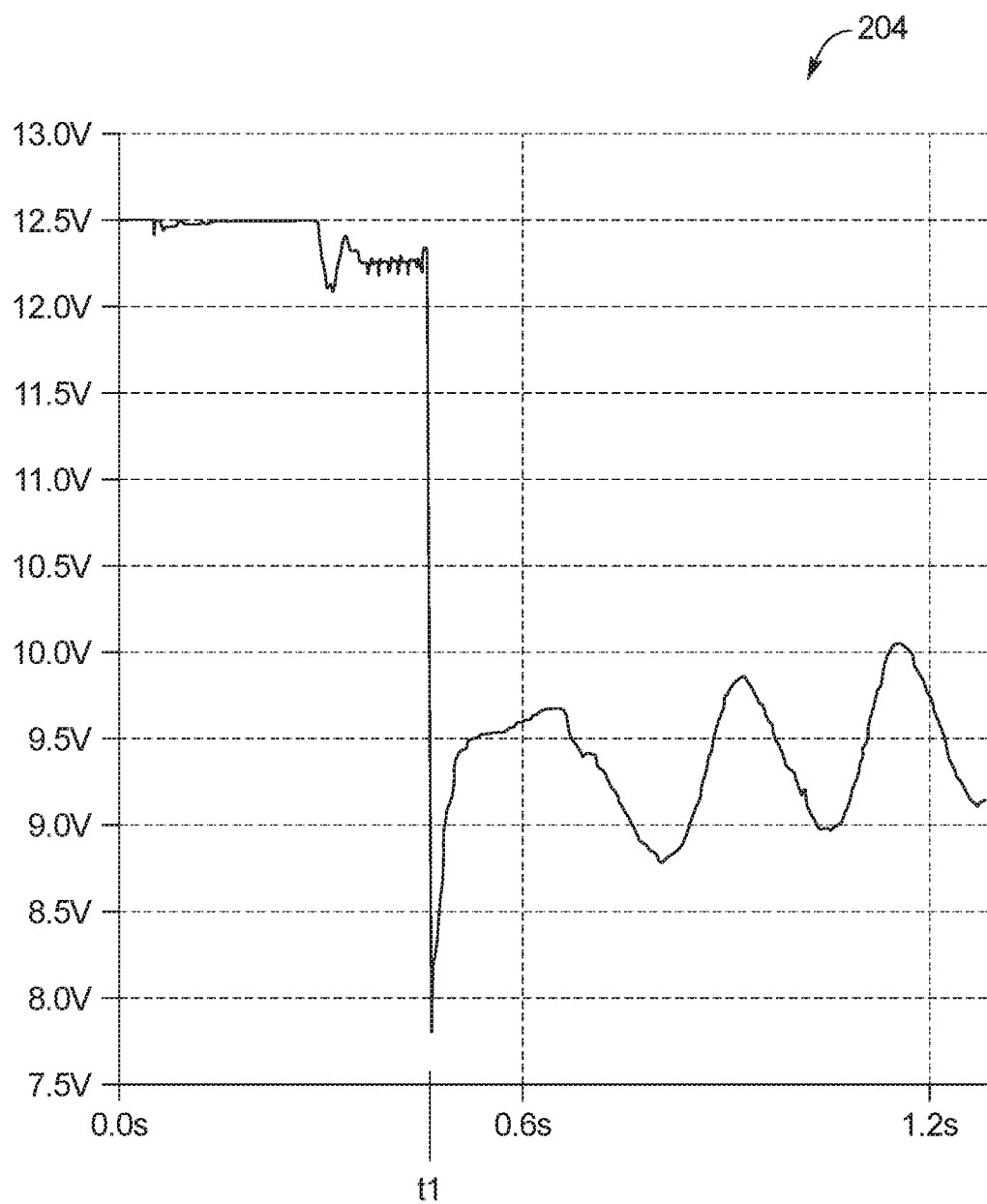
Figure 2C:
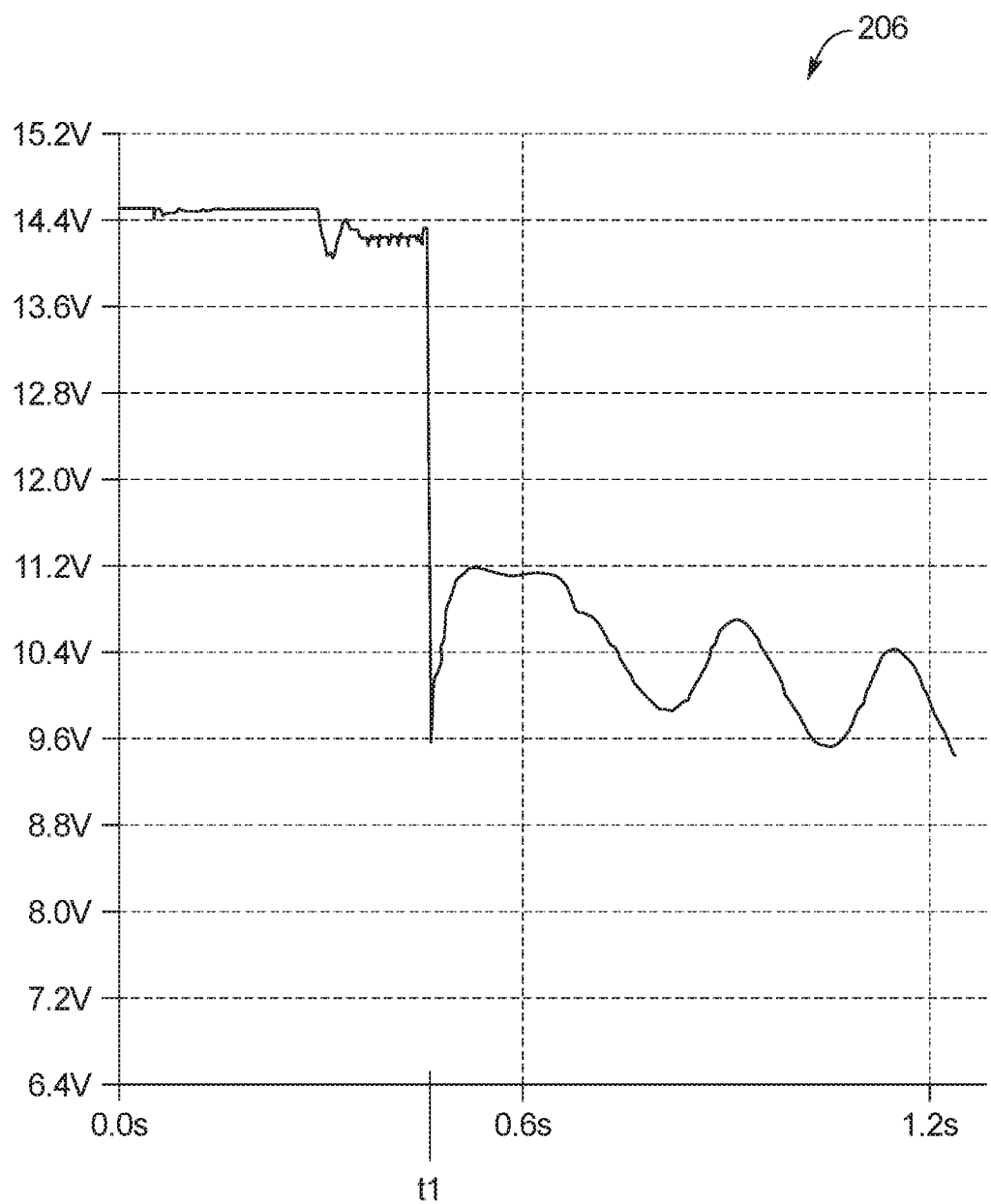

For example, FIGS. 2A-2C illustrate example waveforms of a conventional power system and the vehicle power system in accordance with this disclosure. FIG. 2A illustrates an example current waveform of the worst case scenario for the vehicle starter current. In this figure, as a vehicle starter is initiated, the level of the starter current jumps at t1 from approximately 45 Amps to 940 Amps. FIG. 2B illustrates an example voltage waveform of an SLA battery in the conventional power system. At t1, as the vehicle starter is initiated, the SLA battery dips from approximately 12 Volts to 7 Volts. FIG. 2C illustrates an example voltage waveform of the SLA battery in the vehicle power system in accordance with this disclosure. At t1, as the vehicle starter is initiated, the SLA battery dips from approximately 14.5 Volts to 9.6 Volts. Since the vehicle power system in accordance with this disclosure enables the SLA battery to maintain a higher floating voltage, minimum voltage requirements for functional safety loads such as steering and braking are maintained during transient current events.

Returning to FIG. 1, the bypass circuit 140: (1) generates a first comparison signal based on a voltage difference at the cathode and the anode of the ultra-capacitor 120; (2) compare the first comparison signal with the reference voltage; and (3) in response to the ultra-capacitor 120 nearing zero volt or falling below the reference voltage, causes the transistor 146 to activate and allow current to bypass the ultra-capacitor 120.

Figure 3:
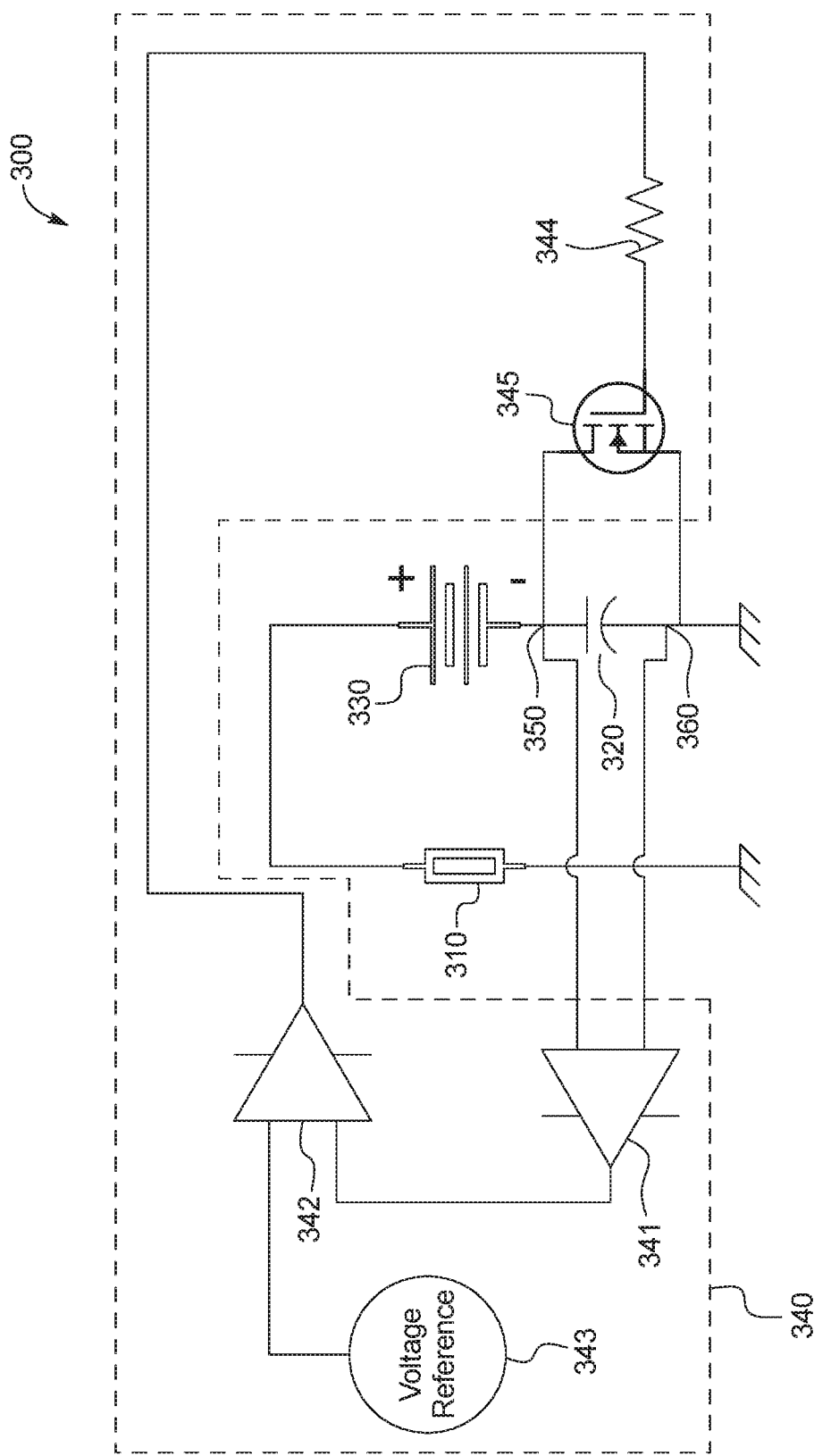
FIG. 3 illustrates a second example embodiment of the vehicle power system in accordance with this disclosure.

FIG. 3 illustrates the second example embodiment of the vehicle power system 300 in accordance with this disclosure. The vehicle power system 300 includes loads 310, an ultra-capacitor 320, an SLA battery 330, a bypass circuit 340, a first node 350, and a second node 360. The capacitance of the ultra-capacitor 320 may be 3400 F. The SLA battery 330 may be a 12 volt battery. The SLA battery 330 may be a lead-acid battery or a lithium battery. The bypass circuit 340 includes a first op-amp 341, a second op-amp 342, a voltage reference 343, a resistor 344, and a transistor 345. The first op-amp 341 is a differential amplifier including two input terminals and an output terminal. The second op-amp 342 includes two terminals and an output terminal. The voltage reference 343 may supply a voltage of 0.1 to 0.2 volt. The transistor 345 may be a MOSFET.

In the illustrated example, the loads 310, the ultra-capacitor 320, and the SLA battery 330 are electrically coupled in series, sequentially. The first node 350 is shared by the one of the input terminals of the first op-amp 341, the negative terminal of the SLA battery 330, the drain of the transistor 345, and the anode of the ultra-capacitor 320. The second node 360 is shared by the cathode of the ultra-capacitor 320, the other input terminal of the first op-amp 341, the ground, and the source of the transistor 345. The output terminal of the first op-amp 341 is input to the second op-amp 342. The other input terminal of the second op-amp 342 is electrically coupled to the voltage reference 343. The output terminal of the second op-amp 342 is electrically coupled to the gate of the transistor 345 via the resistor 344.

Configurations and operations of the second example embodiment of the vehicle power system in accordance with this disclosure is substantially similar to that of the first example embodiment of the vehicle power system in accordance with this disclosure. Therefore, details thereof will not be repeated for the sake of brevity.

The vehicle power systems 100 and 300 as described in FIGS. 1 and 3 may be applied in systems including numerous loads. Specifically, the vehicle power system in accordance with this disclosure may be particularly useful in autonomous vehicles. It should be appreciated that the vehicle power system in accordance with this disclosure is not limited to certain applications, rather, the vehicle power system in accordance with this disclosure may further apply to other power systems known in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A power circuit comprising:
   loads;
   an ultra-capacitor coupled to the loads;
   a battery coupled to the ultra-capacitor; and
   a bypass circuit, wherein the loads, the ultra-capacitor, and the battery are electrically coupled in series,
   wherein the bypass circuit comprises:
      a first op-amp coupled to the ultra-capacitor;
      a second op-amp coupled to a voltage generator, wherein an output of the first op-amp is input to the second op-amp coupled to the output; and
      a transistor coupled to the ultra-capacitor, wherein the transistor is configured to activate based on an output voltage of the second op-amp, and
   wherein bypass circuit is configured to:
      monitor the ultra-capacitor; and
      prevent the ultra-capacitor from over-discharging and reversing in polarity.

2. The power circuit of claim 1, wherein the ultra-capacitor comprises a cathode and an anode, wherein the bypass circuit is coupled to the cathode and the anode.

3. The power circuit of claim 2, further comprising:
   a first node coupled to the anode; and
   a second node coupled to the cathode, wherein the bypass circuit is further configured to provide an electrical path between the first node and the second node based on a voltage difference between the cathode and the anode.

4. The power circuit of claim 1, wherein the first op-amp is a differential amplifier.

5. The power circuit of claim 1, wherein the second op-amp is a zero crossing comparator.

6. The power circuit of claim 1, wherein the bypass circuit further comprises a gate driver and a resistor, wherein an output of the second op-amp is coupled to a gate driver, and wherein the gate driver is coupled to a gate of the transistor via the resistor.

7. The power circuit of claim 1, wherein the ultra-capacitor comprises a cathode and an anode, wherein a drain of the transistor is coupled to the anode and a source of the transistor is coupled to the cathode.

8. A power circuit comprising:
   loads;
   a battery coupled to the loads;
   an ultra-capacitor coupled to the battery; and
   a bypass circuit, wherein the loads, the ultra-capacitor, and the battery are electrically coupled in series,
   wherein the bypass circuit comprises:
      a first op-amp coupled to the ultra-capacitor;
      a second op-amp coupled to a voltage generator, wherein an output of the first op-amp is input to the second op-amp coupled to the output; and
      a transistor coupled to the ultra-capacitor, wherein the transistor is configured to activate based on an output voltage of the second op-amp, and
   wherein bypass circuit is configured to:
      monitor the ultra-capacitor; and
      prevent the ultra-capacitor from over-discharging and reversing in polarity.

9. The power circuit of claim 8, wherein the ultra-capacitor comprises a cathode and an anode, wherein the bypass circuit is coupled to the cathode and the anode.

10. The power circuit of claim 9, further comprising: a first node coupled to the anode; and a second node coupled to the cathode, wherein the bypass circuit is further configured to provide an electrical path between the first node and the second node based on a voltage difference between the cathode and the anode.

11. The power circuit of claim 8, wherein the first op-amp is a differential amplifier.

12. The power circuit of claim 8, wherein the second op-amp is a zero crossing comparator.

13. The power circuit of claim 8, wherein the bypass circuit further comprises a resistor, wherein an output of the second op-amp is coupled to a gate of the transistor via the resistor.

14. The power circuit of claim 8, wherein the ultra-capacitor comprises a cathode and an anode, wherein a drain of the transistor is coupled to the anode and a source of the transistor is coupled to the cathode.

15. A vehicle comprising:
   loads;
   an ultra-capacitor;
   a battery; and
   a bypass circuit, wherein the loads, the ultra-capacitor, and the battery are electrically coupled in series,
   wherein the bypass circuit comprises:
      a first op-amp coupled to the ultra-capacitor;
      a second op-amp coupled to a voltage generator, wherein an output of the first op-amp is input to the second op-amp coupled to the output; and a transistor coupled to the ultra-capacitor, wherein the transistor is configured to activate based on an output voltage of the second op-amp, and wherein bypass circuit is configured to:
monitor the ultra-capacitor; and
prevent the ultra-capacitor from over-discharging and reversing in polarity.

16. The vehicle of claim 15, wherein the ultra-capacitor comprises a cathode and an anode, wherein the bypass circuit is coupled to the cathode and the anode.

17. The vehicle of claim 16, further comprising: a first node coupled to the anode; and a second node coupled to the cathode, wherein the bypass circuit is further configured to provide an electrical path between the first node and the second node based on a voltage difference between the cathode and the anode.

* * * * *